United States Patent [19]

Roland

[11] 4,433,487

[45] Feb. 28, 1984

[54] KEY READING SYSTEM

[75] Inventor: Manfred W. Roland, Mountain View, Calif.

[73] Assignee: All-Lock Electronics, Inc., North Brunswick, N.J.

[21] Appl. No.: 352,548

[22] Filed: Feb. 26, 1982

[51] Int. Cl.³ .......................... E05B 35/04; G01B 7/28

[52] U.S. Cl. ................................ 33/174 F; 33/174 L; 70/358; 70/387

[58] Field of Search .......................... 33/174 L, 174 F; 70/350, 352, 358, 387, 405, 406, 460

[56] References Cited

U.S. PATENT DOCUMENTS

| | | | |
|---|---|---|---|
| 3,264,742 | 8/1966 | Roland | 33/174 F |
| 3,640,107 | 2/1972 | Litvin | 70/405 |
| 3,824,818 | 7/1974 | Neale | 70/358 |
| 3,877,267 | 4/1975 | Harris, Jr. | 70/358 |
| 4,007,615 | 2/1977 | Nossum | 70/387 |
| 4,017,978 | 4/1977 | Peruchon et al. | 33/174 X |
| 4,283,859 | 8/1981 | Roland | 33/174 F |

FOREIGN PATENT DOCUMENTS

| | | | |
|---|---|---|---|
| 482107 | 4/1952 | Canada | 70/387 |
| 2081368 | 2/1982 | United Kingdom | 70/352 |

*Primary Examiner*—Richard R. Stearns
*Attorney, Agent, or Firm*—Larson & Taylor

[57] ABSTRACT

A key reading apparatus having a slot for receiving a key and at least one reading pin sensing depressions or raised projections on a key. The pin has a magnetic portion movable to two different positions, each of which positions place a Hall transistor at a different energy level. The key may have at least two rows of reading points. A clock line device distinguishes successive reading positions.

6 Claims, 3 Drawing Figures

KEY READING SYSTEM

TECHNICAL FIELD

This invention relates to the key-lock art, and in particular it relates to a new and improved apparatus for reading a key and electronically transmitting this reading to perform a function.

BACKGROUND OF THE INVENTION

Arrangements are known for reading physical characteristics such as indentations or raised projections on one or more generally flat sides of a key, utilizing reading pins, and transmitting this reading, via electric or electronic means, to carry out a function. Such functions may include for example identifying the key holder, permitting access to a door or other secure area, or conveying the information to a key making machine to manufacture a duplicate of that key. Such an arrangement is shown in commonly owned U.S. Pat. No. 4,283,859, the subject matter of which is incorporated by reference herein.

In the arrangement shown in said patent, the physical characteristics on the side of the key are read by pins which, acting through mechanical multiplying means, cover or uncover light paths which in turn deactivate or activate photodetectors. These in turn relay the relevant information in connection with the function to ultimately be performed.

While this prior arrangement has proved highly successful, it has been found that in certain applications of the invention, spacial requirements are so restricted that there is insufficient room for the prior arrangement. In such cases, a need exists for improvements which will allow further miniaturization of the key reader.

SUMMARY OF THE INVENTION

It is a purpose of the present invention to provide a new and improved key reader, capable of reading physical characteristics of a key and transmitting that information electrically or electronically, wherein the spacial requirements are sufficiently reduced to allow application of this invention in a more restricted space than is possible with the prior arrangement.

In accordance with the present invention, this purpose is achieved by providing an arrangement in which movement of each reading pin is electrically or electronically read directly, without intervention of a mechanical multiplying means. In accordance with a feature of the present invention, this is achieved by constructing each reading pin to include a magnetic portion, e.g. a permanent magnet, and to place adjacent the reading pin a Hall transistor which has the characteristics of having different energy levels in response to different locations of the magnet, e.g. a close position and a farther position, relative to the Hall transistor. A key to be used with this arrangement would have at each reading point position two possible surfaces, i.e. a high surface and a low surface. In a preferred arrangement the high surface would be the flat side of the key and the low surface would be an indentation in the key at that point. In another embodiment the high surface could be a raised projection on the key at that point and the low surface could be the flat side of the key. In either embodiment one of these surfaces, preferably the high surface, would place the pin, and in particular, the magnetic portion of the pin, at the close proximity position relative to the Hall transistor. When a pin senses the low surface, resilient means or the like would urge the pin to its other position wherein the magnetic portion would be at its farther position relative to the Hall transistor. Suitable electronic means will then sense the position of the pin at any instant by sensing the energy level of the Hall transistor.

Hence, it is an object of the present invention to provide a new and improved apparatus for reading a key.

It is another object of the present invention to provide a new and improved key reading apparatus requiring considerably less space than prior arrangements.

It is still another object of the present invention to provide a new and improved key reading apparatus having a magnetic portion which cooperates with an electronic sensor such as a Hall transistor.

These and other objects of the present invention will become apparent from the detailed description to follow, taken together with the accompanying drawings.

BRIEF DESCRIPTION OF THE DRAWINGS

There follows a detailed description of preferred embodiments of the present invention to be read together with the accompanying drawings wherein.

DETAILED DESCRIPTION OF THE PREFERRED EMBODIMENTS

Figure 3:
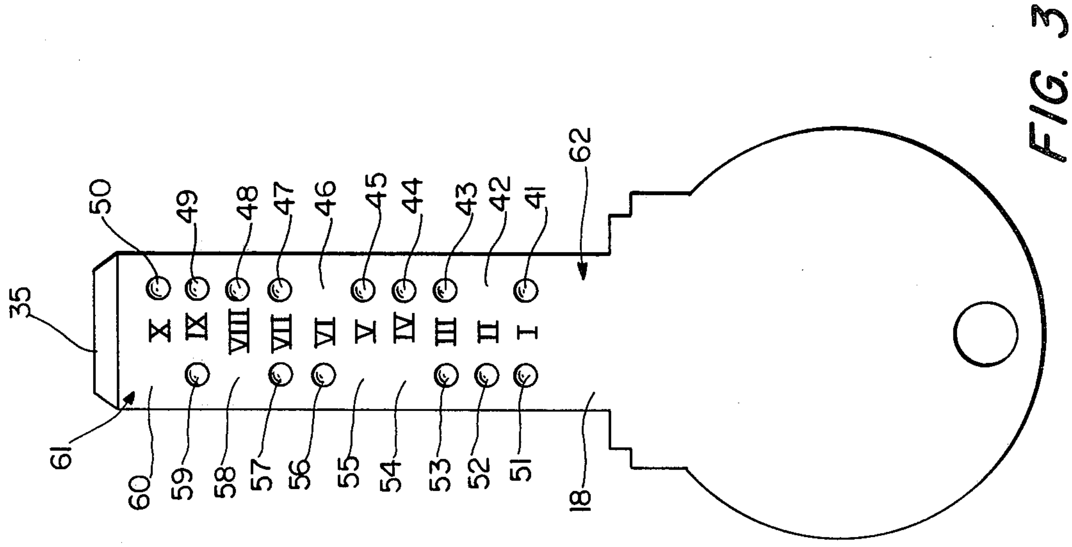
FIG. 3 is an enlarged side view of a key to be used with the key reader of the present invention.

Referring now to the drawings, like elements are represented by like numerals throughout the several views.

Figure 1:
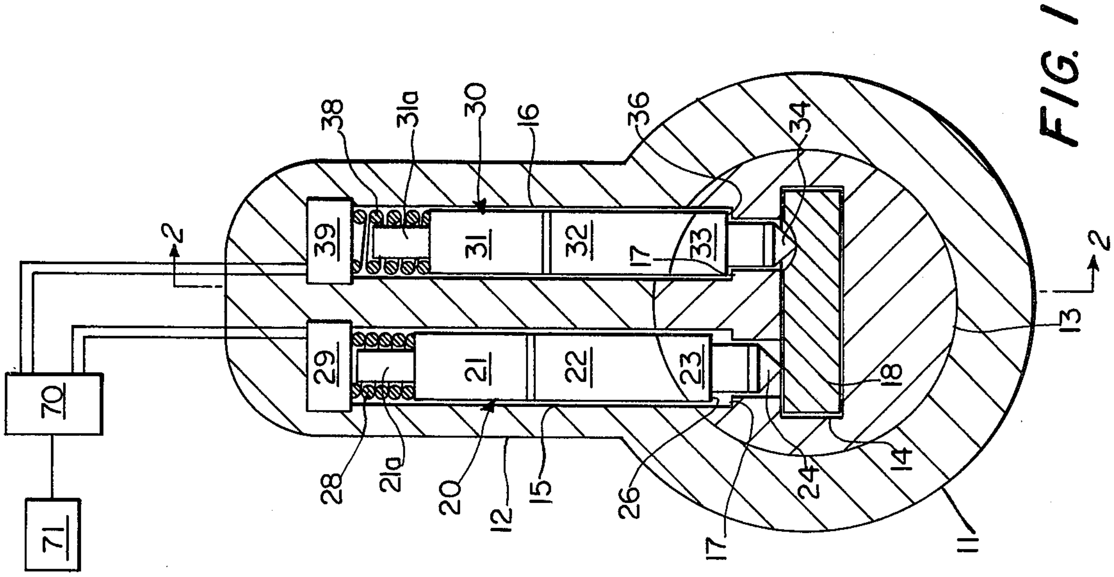
FIG. 1 is a cross sectional view, taken along line 1—1 of FIG. 2, showing the key reader of the present invention.

The key reader apparatus 10 includes a main, elongated housing section 11 having a rotatable cylinder 13 mounted therein and a key slot 14 formed therein. An upper housing section 12 receives the means associated with the reading pins and their associated elements. The area for receiving the reading pins can comprise a single slot with a pair of partial circular cross sectional areas, similar to the slots shown in the said patent, or a pair of separate tubular cavities, and the latter is shown herein for convenience. Referring to FIG. 1, there is shown a left tubular pin cavity 15 and a right tubular pin cavity 16. Each cavity 15 and 16 mates with a tubular cavity in cylinder 13, the latter including a circular, internal shoulder 17 for limiting downward movement of its respective pin, when no key is located in slot 14.

The left reading pin 20 comprises a portion 21 which is a permanent magnet, the magnet including a rear pin portion 21*a*. Located below 21 is an intermediate pin portion 22, and a lower pin portion 23 within cylinder 13, which lower portion includes a circular shoulder 26 which abuts shoulder 17 to limit outward movement of the pin in the absence of a key in slot 14. Pin 20 further includes a front pointed tip 24. The pin is urged outwardly by a spring means 28 so that if no key is present in the key slot 12, shoulder 26 abuts shoulder 17 and the pin 24 is located out into the key slot 14.

The right pin 30 is identical to the pin 20, including a magnetic portion 31 having a rear pin portion 31*a*, an intermediate portion 32 and a lower portion 33 having a shoulder 36 cooperating with a shoulder 17, and a forward tip 34. Spring 38 urges the pin 30 downwardly, urging shoulder 36 into engagement with shoulder 17.

At the upper end of cavities 15 and 16 there is shown, respectively, electronic sensor devices 29 and 39, which are preferably Hall transistors.

Referring to FIG. 1, the left pin 20 is engaging the flat side surface of the key 18 while the right pin 30 has its tip 34 into an indentation 44 in the key. At this time both pins have been moved into their cavities relative to the rest position whereat no key is in the slot. However, pin 20 is urged into its cavity a greater extent than pin 30. Note the closer relationship of rear pin portion 21*a* to the transistor 29 than the pin portion 31*a* to its transistor 39. In this arrangement, pin 20 is engaging a "high surface" of the key and its rear tip 21*a* is in a close proximity position with respect to its transistor 29 while the pin 30 and in particular the tip 34 is engaging a "low surface" portion of the key and its rear pin portion 31*a* is located at its farther position relative to its transistor 39. Hence, if transistors 29 and 39 are of the type which have different energy levels for the two illustrated portions of pin portions 21*a* and 31*a*, then in the illustrated case transistor 29 will be at one energy level while transistor 39 will be at a different energy level.

Figure 2:
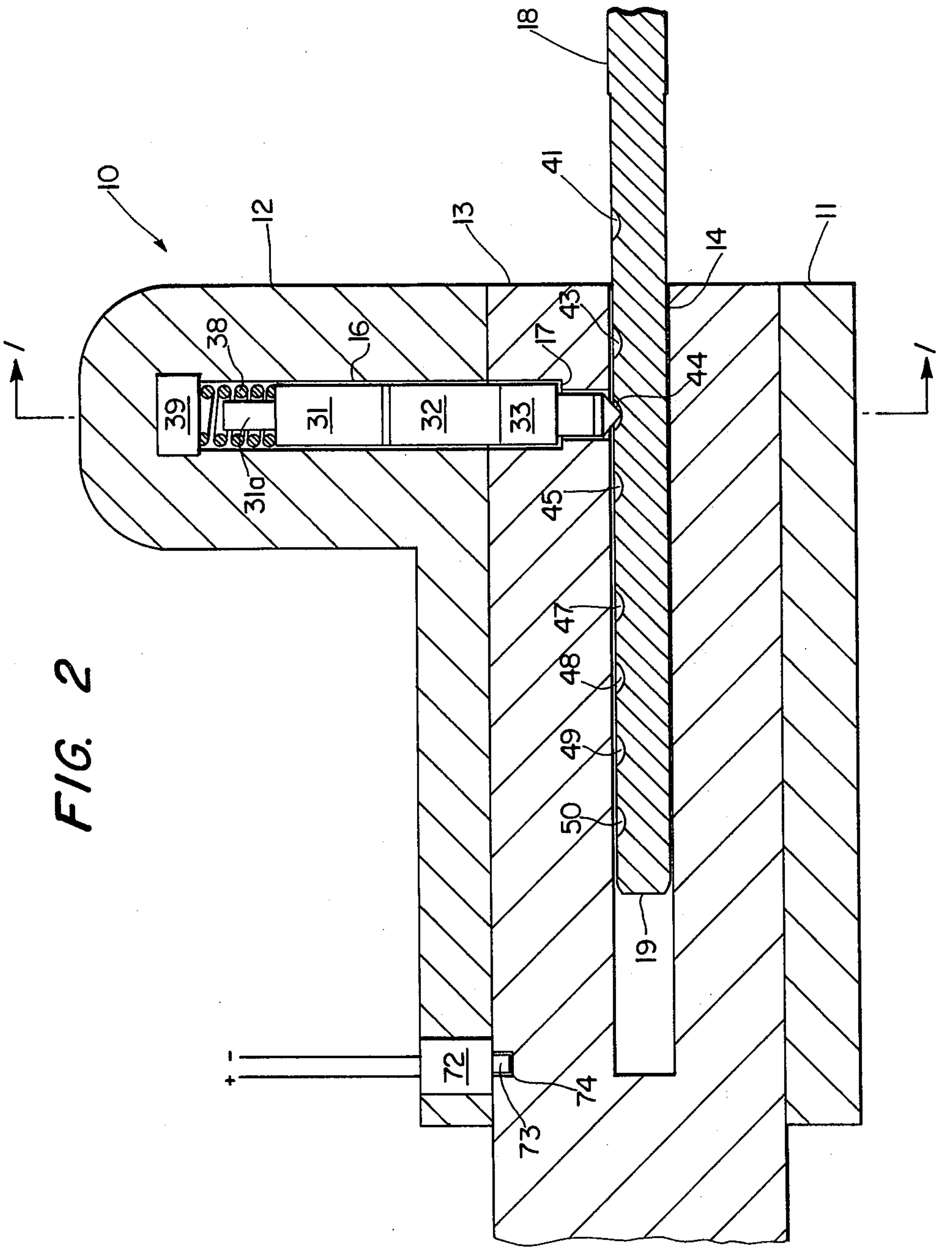
FIG. 2 is a cross sectional view, taken along line 2—2 of FIG. 1.

A key suitable for use with the present invention is designated as element 18 in all three figures. In FIGS. 2 and 3 a front bevelled portion 35 is illustrated. This portion extends laterally beyond the indentations in the key, and hence above and beyond the positions of tips 24 and 34. Hence, in practice when no key is present in slot 12 the two shoulders 26 and 36 abut shoulders 17 and these tips are located out into the slot 14. When the key 18 is inserted into slot 14 this bevelled portion 35 will engage both pins and move them into their respective slots, causing the pins to rise up to the leading edge flat surface portion 61 immediately to the rear of bevelled portion 35. The pins are now in position to make their readings as the reading positions are subsequently moved in succession past the pins.

Referring primarily to FIG. 3, but also to FIGS. 1 and 2, the illustrated key 18 may comprise two parallel rows of reading positions which are identified in FIG. 3 as 41–50 in the right row and 51–60 in the left row, respectively. Each reading position comprises a pair of reading points, one in each row, the two together forming a cooperating pair, there being ten pairs as indicated by the Roman numerals I–X in FIG. 3. If the presence of at least one recess at each reading position is to be sensed as the clock pulse, to designate a reading position then at each reading position, there may be provided two recesses such as recesses 41 and 51 at position I, or only a recess in the left row, such as at 52 in position II, or only a recess in the right row, such as at 44 or 45 in positions IV and V. In this case, at any of the ten positions, three conditions are possible. Alternatively, one row may be complete with clock pulse dimples, the other row or rows being the code rows.

Many modifications and variations of the key codes will be evident. In the preferred arrangement only recesses are used so that in any given position the key will present either a flat surface or a recess. Alternatively, raised projections can be used so that at any given position the key will have either a flat surface or a raised porjection. For purposes of economics, recesses are far preferable to raised projections. Further, since each reading pin only requires two positions, there is no need to mix on a given key three different levels by mixing the flat surface, recesses and raised projections. However, if it were desired to provide three different positions for the reading key, this could be accomplished. Also, while the present invention illustrates only two rows of codes with a total of ten reading positions, it will be apparent that if desired, a third or more rows could be provided and more or less then ten reading positions could be provided. As merely one example, if in a given situation the length of the key had to be severely reduced but could be slightly enlarged horizontally, and the apparatus and the key were constructed with four reading positions I–IV with four reading points at each reading position to cooperate with four different reading pins, then fifteen different conditions would be possible at each of the reading positions I–IV, so that the total number of combinations for this key would be fifteen to the fourth power or 50,625. If a fifth reading position V were added, this would increase the number of combinations to 759,375.

There is shown schematically in FIG. 1 a box 70 which represents means for sensing current in either or both of the transistors 29 and 39 and transmitting a signal to the unit 71 which is representative of a virtually unlimited number of kinds of devices which can utilize this information, examples being means for identifying the person having possession of the key, permitting access to a door or other security area, manufacturing a key which will duplicate the inserted key, etc. Diagrammatic element 70 would also include a clock line means, the details of which are known per se and need not be described herein, which would sense and distinguish each time that a new key reading position was cooperating with the pins.

Often the final purpose of the key reader is to permit opening of a lock of which the reader itself is a part. In this case in the present embodiment, the shear line between pin portions 22, 23 and 32, 33 will lie on the cylindrical surface of cylinder 13 after all readings have been made. In the illustrated embodiment, after all readings the tips 24, 34 will be at flat "rear edge" surface 62, at which both shear lines will be on the cylindrical surface of 13. Then, if device 70 has read an approved code, it can activate solenoid 72 to remove its pin 73 from recess 74 in cylinder 13, after which the key holder can turn cylinder 13 within housing 13, which would unlock a door or the like, by means (not shown) operatively connected to the inward extension of cylinder 13.

The operation of the invention will be apparent from the preceding discussion. However, briefly by way of summary, the present invention would operate as follows, using as an example the specific key 18 shown herein. Prior to key insertion, both reading pins 20 and 30 would be urged outwardly by their respective springs 28 and 38, causing their shoulders 26 and 36 to engage their respective cavity shoulders 17. In this position the pin tips 24 and 34 would be located out into the slot 14. As the key 18 is inserted, its bevelled tip 35 would engage both tips 24 and 34 and move them rearwardly until they rode up onto the flat leading edge area 61 just behind the bevelled front 35. Position X would then engage the two reading pins. Since position X has only a lower depression, the pins would then assume the same position as shown in FIG. 1. During this reading the clock line means associated with element 70 would sense that the first position is being read. A change from the no key position to the leading edge position would have alerted sensor 70 to the fact that a reading position will now commence. As the key 18 is moved farther into the slot, position IX would engage the pins, both of which would move into the respective recesses 49 and 59, causing both pins to engage the inward position of pin 30 in FIG. 1. Again, the clock line means would sense that the key has now brought the next reading position to the pins. This sequence would continue until the last position, namely position I, has been read. In practice, these readings can be made so rapidly that the operator would simply insert the key rapidly without discerning the individual positions. Specifically, each reading can be made in less than seventy milliseconds.

In the present example, assuming that a recess in the left row is read as "one", a dimple in the right row is read as "two" and a dimple in both rows is read as "three", then the code of key 18, reading from position I to X, would be 3, 1, 3, 2, 2, 1, 3, 2, 3 and 2, just one out of 59,049 combinations.

Although the invention has been described in considerable detail with respect to preferred embodiments thereof, it will be apparent that the invention is capable of numerous modifications and variations, apparent to those skilled in the art, without departing from the spirit and scope of the invention.

I claim:

1. An apparatus for reading a key comprising:

a housing having a key opening, a key slot extending from said key opening longitudinally into the housing for receiving a key which essentially mates with the cross section of the key slot, the key slot cross section having at least one operative side which faces a side of the key which is generally flat and has reading positions thereon, at least one pin cavity formed in the housing and intersecting the operative side of the key slot, a reading pin mounted in the pin cavity and movable therein in a direction essentially perpendicular to said operative side of the key slot and intersecting said operative side of the key slot, means for resiliently biasing the pin to a position whereat the pin enters the key slot and is engaged by a key inserted into the key slot, said pin having a magnetic portion, an electronic sensor device in said housing, which device is energized to a first energy level when a magnet is placed into a certain close position relative thereto, and to a second energy level when the magnet is placed at farther position relative thereto, said electronic sensor device mounted in the housing in the vicinity of the magnetic portion of the pin, such that when one of a high surface or low surface on a key is located at a reading position of the pin, the pin is moved against the resilient bias to position said magnetic portion at said close position to place the electronic sensor device at its first energy level, and wherein when the other of the high or low surface of the key is at the reading position of that pin, the pin is moved against the resilient bias such that the magnetic portion thereof is located at said farther position to place the electronic sensor device at said second energy level.

2. The apparatus of claim 1, wherein recesses formed into the key surface form the low surface, and the generally flat side of the key forms the high surface.

3. An apparatus according to claim 1, including clock line means for distinguishing each reading of the key by the pin from readings at successive positions along the key, as the key is moved into the slot, past the reading pin.

4. An apparatus according to any one of claims 1, 2 or 3, including first and second reading pins offset with respect to each other across said operative side of the key slot, such that each pin coacts with a respective first and second row of reading points along the said generally flat side of the key.

5. An apparatus according to claim 4, wherein the clock line means includes means for sensing at least one surface spaced away from the flat side of the key at each reading position.

6. An apparatus according to claim 1, 2 or 3, said electronic sensor device being a Hall transistor.

* * * * *